(12) United States Patent
Adams et al.

(10) Patent No.: US 9,693,580 B2
(45) Date of Patent: *Jul. 4, 2017

(54) METHOD AND SYSTEM FOR RECAPTURING AND REUSING UNREACTED ANTIMICROBIAL SOLUTIONS IN SPRAY APPLICATIONS

(71) Applicant: Ecolab USA Inc., St. Paul, MN (US)

(72) Inventors: Chandler Adams, Lenexa, KS (US); Cayce Warf, Woodinville, WA (US); Roger J. Tippett, Rosemount, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,542

(22) Filed: Jan. 6, 2016

(65) Prior Publication Data

US 2016/0113319 A1    Apr. 28, 2016

Related U.S. Application Data

(60) Continuation of application No. 14/541,002, filed on Nov. 13, 2004, now Pat. No. 9,259,029, which is a
(Continued)

(51) Int. Cl.

| | |
|---|---|
| *A23L 3/358* | (2006.01) |
| *A23B 4/24* | (2006.01) |
| *A23B 4/30* | (2006.01) |
| *A23L 3/3589* | (2006.01) |
| *A23B 4/22* | (2006.01) |

(Continued)

(52) U.S. Cl.
CPC ............... *A23L 3/358* (2013.01); *A23B 4/22* (2013.01); *A23B 4/24* (2013.01); *A23B 4/30* (2013.01); *A23B 7/155* (2013.01); *A23L 3/34635* (2013.01); *A23L 3/3589* (2013.01); *A23V 2002/00* (2013.01)

(58) Field of Classification Search
CPC .... A23L 3/358; A23L 3/34635; A23L 3/3589; A23B 7/155; A23B 4/22; A23B 4/30; A23B 4/24
See application file for complete search history.

(56) References Cited

U.S. PATENT DOCUMENTS

| | | |
|---|---|---|
| 3,440,949 A | 4/1969 | Trussel |
| 3,758,257 A | 9/1973 | Dastur |
| | (Continued) | |

FOREIGN PATENT DOCUMENTS

| | | |
|---|---|---|
| JP | 07155528 | 6/1995 |
| JP | 11286496 | 10/1999 |
| | (Continued) | |

*Primary Examiner* — Regina M Yoo
(74) *Attorney, Agent, or Firm* — Merchant & Gould P.C.

(57) ABSTRACT

A system providing for on-site reclamation and re-use of reclaimed antimicrobial solution includes a dispenser, at least one receptacle, piping, and at least one pump. The dispenser sprays antimicrobial solution toward moving raw food products. Unspent antimicrobial solution that did not contact the moving raw food products and rebound antimicrobial solution that did contact the raw food products combine to form a reclaimed antimicrobial solution. The reclaimed antimicrobial solution is collected in the receptacle and is pumped through the piping to a location for reuse.

9 Claims, 2 Drawing Sheets

Related U.S. Application Data continuation of application No. 12/702,057, filed on Feb. 8, 2010, now Pat. No. 8,916,094, which is a division of application No. 11/335,239, filed on Jan. 19, 2006, now Pat. No. 7,870,822.

(51) Int. Cl.
*A23B 7/155* (2006.01)
*A23L 3/3463* (2006.01)

(56) References Cited

U.S. PATENT DOCUMENTS

| | | | |
|---|---|---|---|
| 3,826,370 A | 7/1974 | Ball et al. | |
| 4,532,858 A | 8/1985 | Hershfeld | |
| 4,790,943 A | 12/1988 | Dunn et al. | |
| 4,805,524 A | 2/1989 | Deneuville et al. | |
| 4,921,719 A | 5/1990 | Kohlbach | |
| 5,008,123 A | 4/1991 | Bewley et al. | |
| 5,053,140 A | 10/1991 | Hurst | |
| 5,080,164 A | 1/1992 | Hermans | |
| 5,114,704 A | 5/1992 | Spanier et al. | |
| 5,173,190 A | 12/1992 | Picek | |
| 5,228,396 A | 7/1993 | Pfaff | |
| 5,269,216 A | 12/1993 | Corominas | |
| 5,437,868 A | 8/1995 | Oakes et al. | |
| 5,470,472 A | 11/1995 | Baird et al. | |
| 5,489,434 A | 2/1996 | Oakes et al. | |
| 5,522,309 A | 6/1996 | Mizobuchi et al. | |
| 5,537,916 A | 7/1996 | Lagares-Corominas | |
| 5,651,730 A * | 7/1997 | McGinnis | A22B 5/08 452/74 |
| 5,685,125 A | 11/1997 | Cattelli et al. | |
| 5,718,910 A | 2/1998 | Oakes et al. | |
| 5,833,975 A | 11/1998 | Paoletti et al. | |
| 5,879,732 A | 3/1999 | Caracciolo, Jr. et al. | |
| 5,942,235 A | 8/1999 | Paoletti | |
| 6,019,033 A | 2/2000 | Wilson et al. | |
| 6,036,918 A | 3/2000 | Kowanko | |
| 6,167,709 B1 | 1/2001 | Caracciolo, Jr. et al. | |
| 6,182,833 B1 | 2/2001 | Zittel | |
| 6,265,189 B1 | 7/2001 | Paoletti et al. | |
| 6,326,032 B1 | 12/2001 | Richter et al. | |
| 6,348,227 B1 | 2/2002 | Caracciolo, Jr. | |
| 6,351,932 B1 | 3/2002 | Hummel | |
| 6,479,454 B1 | 11/2002 | Smith et al. | |
| 6,503,401 B1 | 1/2003 | Willis | |
| 6,514,556 B2 | 2/2003 | Hilgren et al. | |
| 6,545,047 B2 | 4/2003 | Gutzmann et al. | |
| 6,551,182 B2 | 4/2003 | Caracciolo, Jr. | |
| 6,558,622 B1 | 5/2003 | Malchesky | |
| 6,565,803 B1 | 5/2003 | Bolton et al. | |
| 6,605,253 B1 | 8/2003 | Perkins | |
| 6,802,984 B1 | 10/2004 | Perkins et al. | |
| 6,976,421 B2 | 12/2005 | Hansen et al. | |
| 7,273,630 B2 * | 9/2007 | Alam | A23B 4/20 426/332 |
| 7,870,822 B2 | 1/2011 | Adams et al. | |
| 8,916,094 B2 | 12/2014 | Adams et al. | |
| 2003/0012857 A1 * | 1/2003 | Alam | A23B 4/20 426/332 |
| 2003/0013401 A1 | 1/2003 | Caracciolo, Jr. | |
| 2003/0047087 A1 | 3/2003 | Phebus et al. | |
| 2005/0181720 A1 | 8/2005 | Osborn et al. | |
| 2007/0025897 A1 | 2/2007 | Rheingans et al. | |
| 2007/0084802 A1 | 4/2007 | Hilgren et al. | |
| 2009/0196967 A1 | 8/2009 | Nolen et al. | |

FOREIGN PATENT DOCUMENTS

| | | |
|---|---|---|
| WO | WO2004/007378 | 1/2004 |
| WO | WO2004/043162 A2 | 5/2004 |
| WO | WO2004/043162 A3 | 5/2004 |

* cited by examiner

METHOD AND SYSTEM FOR RECAPTURING AND REUSING UNREACTED ANTIMICROBIAL SOLUTIONS IN SPRAY APPLICATIONS

CROSS REFERENCE TO RELATED APPLICATION

This application is a continuation of U.S. application Ser. No. 14/541,002, filed Nov. 13, 2014, published as U.S. 2015/0093481, and issued as U.S. Pat. No. 9,259,029 on Feb. 16, 2016, which is a continuation of U.S. application Ser. No. 12/702,057, filed Feb. 8, 2010, published as US2010/0136189-A1, and issued as U.S. Pat. No. 8,916,094 on Dec. 23, 2014, which is a divisional application of U.S. application Ser. No. 11/335,239, filed Jan. 19, 2006, and issued as U.S. Pat. No. 7,870,822 on Jan. 18, 2011. The entire disclosures of which are hereby expressly incorporated herein by reference including, without limitation, the specification, claims, and abstracts, as well as any figures, tables, or drawings thereof.

BACKGROUND OF THE INVENTION

The present invention relates to the field of food processing. In particular, the present invention relates to a system and a method for on-site reclamation and reapplication of raw food product antimicrobial solution.

One of the stages in raw food product processing is disinfecting the raw food product in order to reduce or control microbial populations on the surface of the raw food products. During the disinfecting stage, the surface of the raw food product is sprayed with a disinfecting solution, typically an antimicrobial solution, to kill or remove organics and inorganics, both dissolved and particulate, from the surface of the raw food product. The raw food product (e.g., poultry, beef sides or products, fruits, vegetables) is moved through the processing system along an automated device, such as a conveyor rail, and is sprayed by stationary or moving spray nozzles positioned on either side of the conveyor rail. Antimicrobial solution is applied onto the raw food products through the spray nozzles to reduce microbial populations on the raw food product. Thus, as the raw food product travels along the conveyor rail, it is sprayed with antimicrobial solution from various directions. While the spray nozzles usually provide a continuous spray, the raw food products are typically spaced apart from one another as they move along the conveyor rail. Thus, as the raw food products travel along the conveyor rail, a portion of the spray volume will contact the surfaces of the raw food products and a portion of the spray volume will pass through the spaces between the raw food products.

Although recycling the entire runoff of the antimicrobial solution is technically feasible, current systems are complex, time-consuming, and not cost-effective. The recaptured antimicrobial solution must be filtered and treated to remove soluble organics as well as particulates removed from the surface of the raw food products to meet regulatory parameters set by the United States Department of Agriculture (USDA) prior to reuse. A widely used antimicrobial solution is acidified sodium chlorite (ASC). Fresh ASC antimicrobial solution must meet FDA approvals (21 C.F.R. 173.325) as well as industry standards. Immediately after mixing the sodium chlorite with an acid solution, a certain amount of chlorous acid is formed. After contacting the surfaces of the raw food products, the concentration of chlorous acid and sodium chlorite decreases, making the solution less effective. This typically occurs in two ways. First, a portion of the chlorous acid in the antimicrobial solution reacts with organics and inorganics on the surface of the raw food product, decreasing the sodium chlorite concentration of the spent solution. Second, some raw food products exude sera or other materials that buffer and/or consume some of the acidity of the antimicrobial solution such that the pH of the spent solution is higher than the initial pH of the solution.

BRIEF SUMMARY OF THE INVENTION

A system providing for on-site reclamation and re-use of reclaimed antimicrobial solution includes a dispenser, at least one receptacle, piping, and at least one pump. The dispenser sprays antimicrobial solution toward moving raw food products. Unspent antimicrobial solution that did not contact the moving raw food products and rebound antimicrobial solution that did contact the raw food products combine to form a reclaimed antimicrobial solution. The reclaimed antimicrobial solution is collected in the receptacle and is pumped through the piping to a location for reuse.

DETAILED DESCRIPTION

Figure 1:
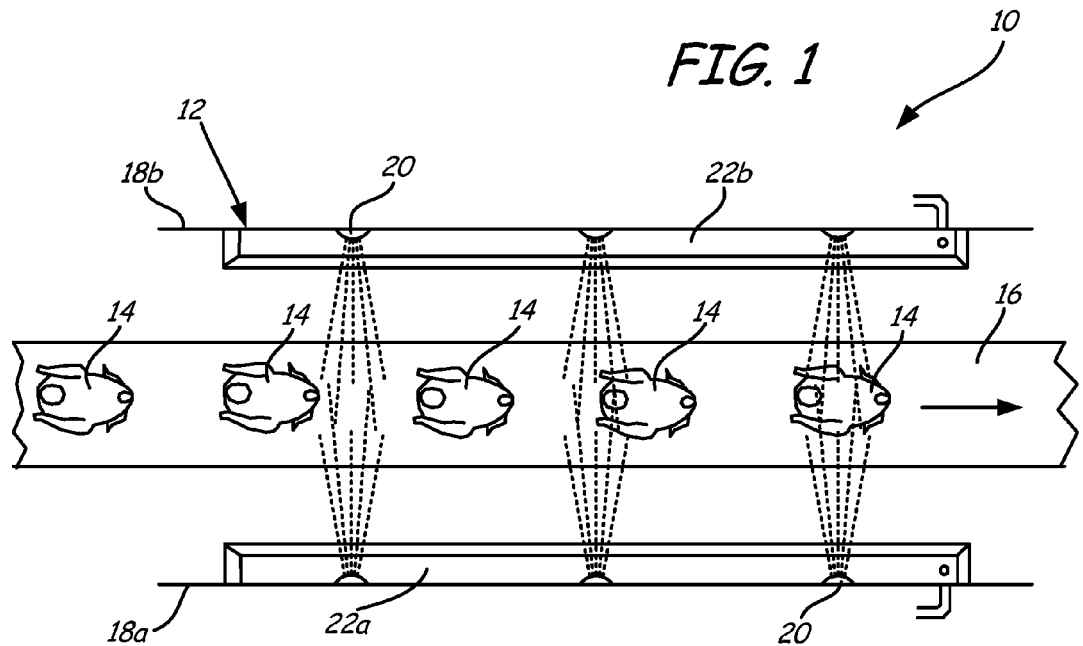
FIG. 1 is an overhead view of a disinfecting stage of an antimicrobial solution reapplication system.

FIG. 1 is an overhead view of a disinfecting stage of an antimicrobial solution reapplication system 10 in accordance with the present invention. Reapplication system 10 is an antimicrobial solution reclamation and reapplication system that permits the reuse of reclaimed antimicrobial solution during raw food processing by reclaiming unspent antimicrobial solution as well as some spent antimicrobial solution. Reapplication system 10 is beneficial for reducing antimicrobial solution consumption through more efficient utilization of antimicrobial solution, which in turn also decreases the impact on the environment. Although the specification discusses the reclamation and reapplication of antimicrobial solution, those skilled in the art will recognize that the system and method can be used for the reclamation and reapplication of any sprayed-on additive.

FIG. 1 specifically shows a first disinfecting stage 12 of reapplication system 10. Disinfecting stage 12 removes organics, inorganics, and other particulates from raw food product 14 and generally includes conveyor rail 16, opposing first wall 18a and second wall 18b, spray nozzles 20, first receptacle 22a and second receptacle 22b, and circulation system 24 (shown and described in FIG. 2). Conveyor rail 16 is positioned between opposing first and second walls 18a and 18b and moves raw food product 14 through disinfecting stage 12.

Spray nozzles 20 are positioned along opposing first and second walls 18a and 18b of disinfecting stage 12 and contain antimicrobial solution for disinfecting raw food product 14. As raw food product 14 moves along conveyor rail 16, spray nozzles 20 continuously spray antimicrobial solution towards raw food product 14. Antimicrobial solution is sprayed from spray nozzles 20 at a force sufficient to propel the droplets of antimicrobial solution to raw food product 14 as well as the opposing wall. Although FIG. 1 depicts spray nozzles 20 in staggered positions along opposing first and second walls 18a and 18b, spray nozzles 20 can be positioned along first and second walls 18a and 18b in a variety of arrangements as long as the droplets of antimicrobial solution leaving spray nozzles 20 are not prevented from reaching either raw food product 14. Additionally, although FIG. 1 depicts spray nozzles 20 positioned along first and second walls 18a and 18b, spray nozzles can also be positioned on the ceiling or floor, as long as the antimicrobial solution is directed to contact raw food product 14.

First and second receptacles 22a and 22b are positioned directly below spray nozzles 20 along first and second walls 18a and 18b, respectively. As antimicrobial solution is sprayed toward raw food product 14, a portion of the antimicrobial solution will contact raw food product 14 (spent antimicrobial solution) and adhere to the surface of raw food product 14. Because raw food products 14 are spaced along conveyor rail 16 at a distance from one another, a portion of the antimicrobial solution will not contact raw food products 14 (unspent antimicrobial solution). The unspent antimicrobial solution thus continues past conveyor rail 16 and raw food product 14. The unspent antimicrobial solution from spray nozzles 20 positioned along first wall 18a continues toward opposing second wall 18b, while the unspent antimicrobial solution from spray nozzles 20 positioned along second wall 18b continues toward opposing first wall 18a. Once the unspent antimicrobial solution contacts respective opposing first or second wall 18a and 18b, the unspent antimicrobial solution runs down first or second wall 18a and 18b and into first and second receptacles 22a and 22b, respectively. Although FIG. 1 depicts first and second receptacles 22a and 22b positioned directly below spray nozzles 20, first and second receptacles 22a and 22b can be positioned at different locations as long as first and second receptacles 22a and 22b are positioned to receive the unspent antimicrobial solution after it is sprayed at raw food products 14.

When the antimicrobial solution contacts raw food product 14, the chemicals in the antimicrobial solution react with dissolved organics, inorganics, and/or particles on the surface of raw food product 14 and are typically not be reused without first being reconditioned. In contrast, the unspent antimicrobial solution collected in first and second receptacles 22a and 22b are not significantly degraded because it never contacted raw food product 14 and did not undergo any chemical reactions, such as oxidation or reduction. In addition, the unspent antimicrobial solution will not be buffered outside any pH specifications that may be set by the FDA and/or USDA. Some spent antimicrobial solution containing organic contaminants and particulates (rebound antimicrobial solution) will also be collected into first and second receptacles 22a and 22b along with the unspent antimicrobial solution through deflection or rebound off raw food product 14, or through other means. Although a portion of the rebound antimicrobial solution is mixed with the unspent antimicrobial solution (reclaimed antimicrobial solution) in first and second receptacles 22a and 22b, the level of organic contaminants and particulates in the reclaimed antimicrobial solution is still less than the level of organic contaminants and particulates that would be present in a solution combining all of the spent antimicrobial solution and all of the unspent antimicrobial solution. After the reclaimed antimicrobial solution has been collected, the reclaimed antimicrobial solution is typically sent through a reconditioning step, such as filtration, prior to reuse in order to satisfy USDA standards and regulations. Optionally, if the level of organic contaminants and particulates in the reclaimed antimicrobial solution satisfies USDA standards and regulations, the reclaimed antimicrobial solution can be immediately reused without reconditioning.

Examples of suitable antimicrobial solutions include, but are not limited to: octanoic acid, acetic acid, acidified sodium chlorite, carnobacterium maltaromaticum stain CB1; cetylpyridinium chloride; citric acid; chlorine dioxide; 1,3 di-bromo-5,5-dimethylhydantoin; citric acid, phosphoric acid, and hydrochloric acid mixtures; lactic acid; lactoferrin; lauramide arginine ethyl ester; nisin, ozone; hydrogen peroxide; peroxyacetic acid; peroxyoctanoic acid; potassium diacetate; lactic acid and acidic calcium sulfate mixtures; lactic acid, acidic calcium sulfate, and propionic acid mixtures; lactic acid, calcium sulfate, and sodium phosphate mixtures; sodium metasilicate; trisodium phosphate; or combinations thereof. An example of a suitable commercially available antimicrobial solution includes, but is not limited to, trade designated SANOVA® acidified sodium chlorite, available from Ecolab, Incorporated, Saint Paul, Minn.

Figure 2:
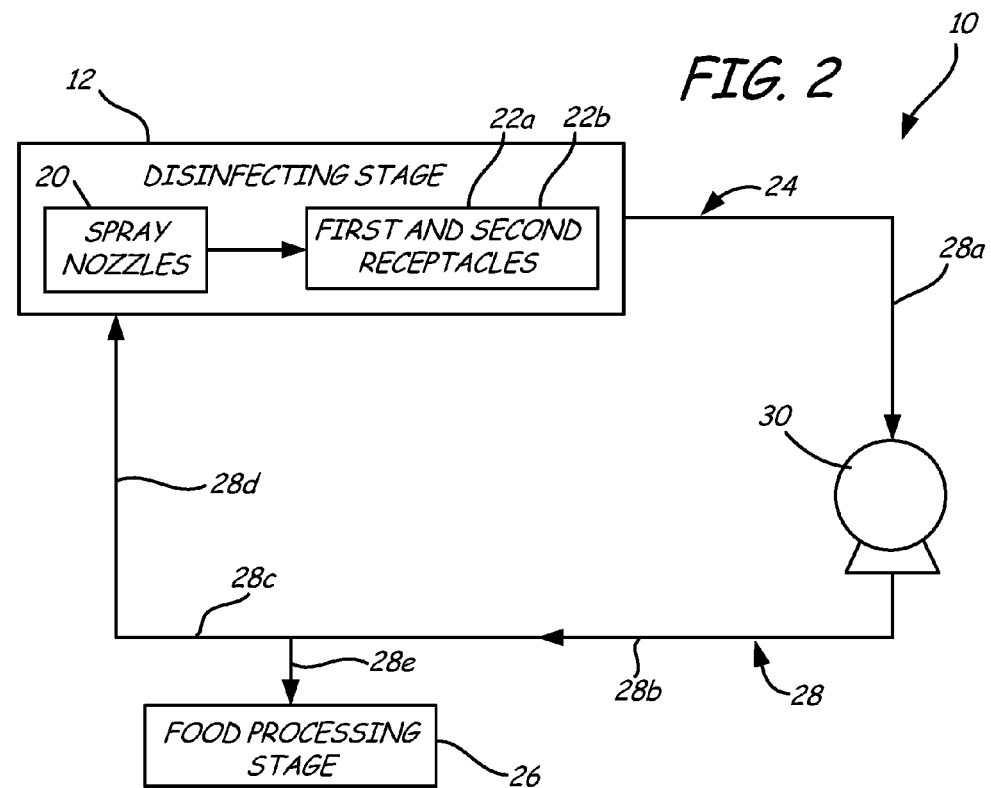
FIG. 2 is a diagram of the antimicrobial solution reapplication system of the present invention.

FIG. 2 is a diagram of reapplication system 10 showing disinfecting stage 12, which includes spray nozzles 20 and first and second receptacles 22a and 22b, circulation system 24, and raw food processing stage 26. Circulation system 24 generally includes piping 28 and pump 30. Circulation system 24 circulates the reclaimed antimicrobial solution through reapplication system 10. Piping 28 of circulation system 24 generally includes collection line 28a, intermediate line 28b, T-line 28c, recycle line 28d, and secondary line 28e. Collection line 28a connects disinfecting stage 12 and pump 30. First intermediate line 28b connects pump 30 to T-line 28c, which is connected to recycle line 28d and secondary line 28e. When the reclaimed antimicrobial solution comes to T-line 28c, the reclaimed antimicrobial solution can be passed to recycle line 28d, secondary line 28e, or both recycle line 28d and secondary line 28e. Recycle line 28d connects T-line 26c and disinfecting stage 12. Secondary line 28e connects T-line 28c and raw food processing stage 26. Pump 30 pumps the unspent solution collected in first and second receptacles 22a and 22b through piping 28.

After the mixture of unspent and rebound antimicrobial solution has been reclaimed by first and second receptacles 22a and 22b (shown in FIG. 1), circulation system 24 of reapplication system 10 transports the reclaimed antimicrobial solution back to disinfecting stage 12 or raw food processing stage 26 for reuse. Optionally, reapplication system 10 can also include a reconditioning stage upstream of food processing stage 26 or disinfecting stage 12.

Figure 3:
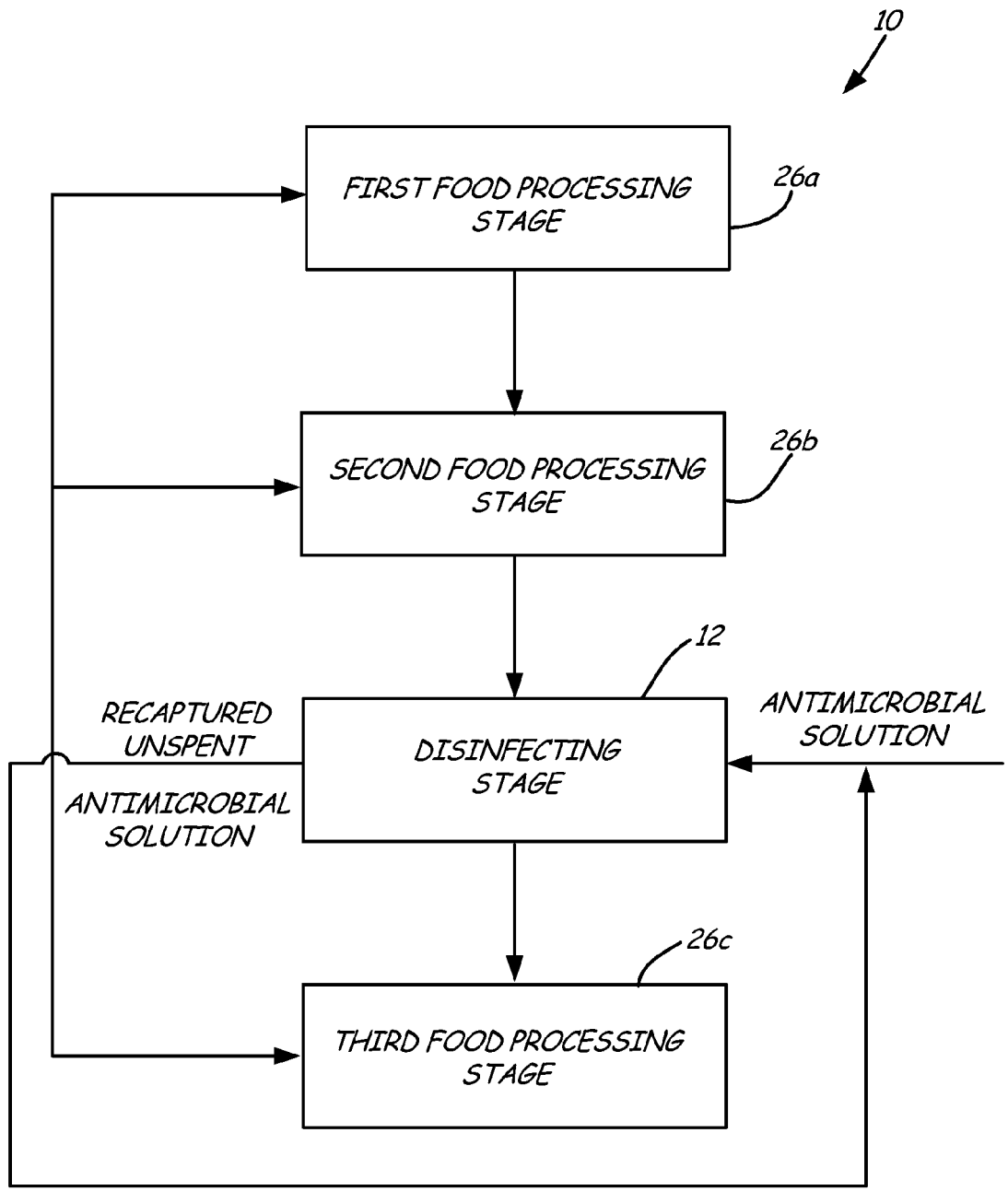
FIG. 3 is a block diagram of the antimicrobial solution reapplication system of the present invention.

FIG. 3 is a block diagram of reapplication system 10 showing first food processing stage 26a, second food processing stage 26b, disinfecting stage 12, and third food processing stage 26c. During raw food processing, the raw food product is passed through numerous food-processing stages in preparation for human consumption. First and second food processing stages 26a and 26b occur prior to disinfecting stage 12 and can be any number of food processing steps where antimicrobial solution is needed. For example, first or second food processing stages 26a and 26b can include stripping the raw food product of any undesirable exterior protection, such as, but not limited to: removing hides from red meat carcasses, removing feathers from poultry products, or removing stems from fruit or vegetable products. First and second food processing stages 26a and 26b can also include eviscerating the raw food product, including, but not limited to, removing the guts of red meat carcasses or poultry products.

Third food processing stage 26c occurs after disinfecting stage 12 and can include any number of food processing steps where antimicrobial solution is needed. For example, third food processing stage 26c can include applying antimicrobial solution to a raw food product after it has been stripped of any undesirable products and is ready for human consumption, including, but limited to, a cold carcass application of antimicrobial solution.

After antimicrobial solution has been sprayed in disinfecting stage 12, the reclaimed antimicrobial solution is collected for transport and reuse in various raw food processing stages of reapplication system 10. Circulation system 24 (shown in FIG. 2) transports the reclaimed antimicrobial solution to any raw food processing stage in reapplication system 10 requiring antimicrobial solution, including first, second, and third food processing stages 26a, 26b, and 26c. The reclaimed antimicrobial solution can also be transported back to disinfecting stage 12 for reuse. While FIG. 3 depicts recapturing the reclaimed antimicrobial solution for reuse only during disinfecting stage 12 of reapplication system 10, the reclaimed antimicrobial solution can be recaptured and reused during any stage of reapplication system 10. Additionally the reclaimed antimicrobial solution can be sent through a filtering stage prior to reuse.

The reclaimed antimicrobial solution recapture and reapplication system of the present invention collects the reclaimed antimicrobial solution from a raw food processing stage and transports the reclaimed antimicrobial solution to the reapplication system for reuse. During numerous stages of raw food processing, antimicrobial solution is sprayed toward a raw food product for disinfection. A portion of the antimicrobial solution contacts the raw food product and reacts with organics, inorganics, and other particulates on the surface of the raw food product to disinfect the raw food product. Another portion of the antimicrobial solution does not contact the raw food product and remains in substantially fresh condition. The unspent antimicrobial solution, along with any rebound antimicrobial solution is collected and transported through a circulation system of the reapplication system to a raw food processing stage for reuse.

Although the present invention has been described with reference to preferred embodiments, workers skilled in the art will recognize that changes may be made in form and detail without departing from the spirit and scope of the invention.

What is claimed is:

1. A method for on-site reclamation and reapplication of reclaimed antimicrobial solution in a raw food product processing system, the method comprising:
    (a) spraying an antimicrobial solution from nozzles arranged at a first side and a second side opposite of the first side of a disinfecting stage toward raw food products transported through the disinfecting stage;
    (b) collecting unspent antimicrobial solution that did not contact the raw food products and rebound antimicrobial solution that did contact the raw food products to form a reclaimed antimicrobial solution in a first receptacle arranged on the first side and a second receptacle arranged on the second side;
    (c) pumping the reclaimed antimicrobial solution from the first receptacle and the second receptacle through piping;
    (d) transporting the reclaimed antimicrobial solution to a reuse location in the raw food product processing system; and
    (e) spraying the raw food products with the reclaimed antimicrobial solution at the reuse location in the raw food product processing system.

2. The method of claim 1, wherein the step of spraying the antimicrobial solution occurs continuously.

3. The method of claim 1, wherein the steps of spraying the antimicrobial solution and spraying the reclaimed antimicrobial solution comprise spraying acidified sodium chlorite.

4. The method of claim 1, further comprising reconditioning the reclaimed antimicrobial solution prior to the step of transporting the reclaimed antimicrobial solution to the reuse location.

5. The method of claim 4, wherein the step of reconditioning the reclaimed antimicrobial solution comprises filtering the reclaimed antimicrobial solution.

6. The method of claim 1, wherein the raw food products are transported along a conveyor through the disinfecting stage.

7. The method of claim 6, wherein the disinfecting stage comprises a first wall at the first side and a second wall at the second side, the first and second walls being aligned parallel to a direction of movement of the conveyor.

8. The method of claim 1, wherein the nozzles arranged at the first side form a first set of nozzles and the nozzles arranged at the second side form a second set of nozzles, wherein the disinfecting stage comprises a first wall at the first side, the first set of nozzles being mounted on the first wall, and a second wall at the second side, the second set of nozzles being mounted on the second wall, the first and second walls being aligned parallel to a direction of movement of a conveyor.

9. The method of claim 1, wherein the first receptacle is positioned in an area below the first set of nozzles and the second receptacle is positioned in an area below the second set of nozzles.

* * * * *

UNITED STATES PATENT AND TRADEMARK OFFICE
CERTIFICATE OF CORRECTION

PATENT NO. : 9,693,580 B2
APPLICATION NO. : 14/989542
DATED : July 4, 2017
INVENTOR(S) : Adams et al.

Page 1 of 1

It is certified that error appears in the above-identified patent and that said Letters Patent is hereby corrected as shown below:

On the Title Page

Item [60], delete "Nov. 13, 2004," and insert --Nov. 13, 2014--

Signed and Sealed this
Fifth Day of May, 2020

Andrei Iancu
*Director of the United States Patent and Trademark Office*